United States Patent
Siniff et al.

(10) Patent No.: US 8,200,433 B1
(45) Date of Patent: Jun. 12, 2012

(54) COMBINING NAVIGATION CHART INFORMATION WITH SYNTHETIC VISION TERRAIN REPRESENTATION ON A SYNTHETIC VISION SYSTEM DISPLAY

(75) Inventors: Alan E. Siniff, Marion, IA (US); Jason D. Marmur, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 869 days.

(21) Appl. No.: 11/895,313

(22) Filed: Aug. 24, 2007

(51) Int. Cl.
*G01C 21/00* (2006.01)

(52) U.S. Cl. ........ 701/540; 701/430; 701/436; 701/439; 701/454; 701/458; 701/461; 701/462; 701/523; 701/528; 701/532; 701/533; 340/995.1; 340/995.11; 340/995.14; 340/995.19; 340/995.24; 340/995.27; 353/5; 353/11

(58) Field of Classification Search ............... 701/200, 701/24, 25, 409, 421, 430, 436, 439, 450, 701/454, 458, 461, 462, 528, 533, 540
See application file for complete search history.

(56) References Cited

U.S. PATENT DOCUMENTS

| | | | |
|---|---|---|---|
| 6,314,370 B1 * | 11/2001 | Curtright | 701/412 |
| 6,750,815 B2 * | 6/2004 | Michaelson et al. | 342/357.31 |
| 6,842,693 B2 * | 1/2005 | Nagamune | 701/533 |
| 7,010,398 B2 * | 3/2006 | Wilkins et al. | 701/3 |
| 7,148,861 B2 * | 12/2006 | Yelton et al. | 345/8 |
| 7,312,725 B2 * | 12/2007 | Berson et al. | 340/980 |
| 7,411,594 B2 * | 8/2008 | Endo et al. | 345/633 |
| 7,921,136 B1 * | 4/2011 | Shuman et al. | 707/802 |
| 2003/0222887 A1 * | 12/2003 | Wilkins et al. | 345/618 |
| 2004/0169617 A1 * | 9/2004 | Yelton et al. | 345/1.1 |
| 2005/0007261 A1 * | 1/2005 | Berson et al. | 340/945 |
| 2007/0112507 A1 * | 5/2007 | Bargeron et al. | 701/208 |
| 2007/0118281 A1 * | 5/2007 | Adam et al. | 701/211 |
| 2007/0297696 A1 * | 12/2007 | Hamza et al. | 382/294 |
| 2008/0195309 A1 * | 8/2008 | Prinzel, III et al. | 701/208 |

\* cited by examiner

*Primary Examiner* — Jack W Keith
*Assistant Examiner* — Rami Khatib
(74) *Attorney, Agent, or Firm* — Donna P. Suchy; Daniel M. Barbieri (57) ABSTRACT

The present disclosure is directed to a Synthetic Vision System (SVS) view combined with information from navigation charts. The operator of a vehicle is not required to mentally combine separate SVS view and navigation charts, increasing situational awareness and decreasing complexity. A synthetic terrain representation is generated, combined with navigation chart information, and displayed. Additionally, the combination may include an indicator indicating the intended path of the current planned course. The combination may be generated with less detailed navigation chart information when further away or more detailed navigation chart information when close, displaying more detail as landmarks are approached. The combination may include indicators representing one or more navigation aids based on information in the navigation charts. The combination may include text based on navigation chart information.

12 Claims, 6 Drawing Sheets

COMBINING NAVIGATION CHART INFORMATION WITH SYNTHETIC VISION TERRAIN REPRESENTATION ON A SYNTHETIC VISION SYSTEM DISPLAY

FIELD OF THE INVENTION

The present disclosure relates generally to guidance systems and more particularly to synthetic vision systems.

BACKGROUND OF THE INVENTION

Synthetic Vision Systems (SVS) generate and present a realistic and intuitive simulated view of the world outside of a vehicle, such as an aircraft, a tank, an automobile, a boat, or a submarine. SVS provide the operators of vehicles, such as the pilots of aircraft, with clear and intuitive means of understanding their operating environment. By providing a clear and intuitive means of understanding an operating environment, SVS contribute to situational awareness. Situational awareness is the mental representation and understanding of objects, environmental conditions, and other situation-specific factors affecting human performance in complex and dynamic tasks. Increasing situational awareness for the operator of a vehicle increases operator performance and reduces operator error.

Navigation charts are maps designed to assist in navigation. By utilizing navigation charts, operators of vehicles are able to determine position, the best route to a destination, and other useful information. Navigation charts may include nautical charts (which assist in navigation in or on the sea), surface charts (which assist in ground navigation such as ground navigation while taxiing around an airport) (including, but not limited to, terminal charts), and aeronautical charts (which assist in the navigation of aircraft). Nautical charts may illustrate depths of water, heights of land, locations of natural and man-made navigation aids (any sort of marker which aids in navigation), information on tides and currents, local details of the Earth's magnetic field, and man-made structures. Aeronautical charts may illustrate local topography, elevation, land and water features, roads, towns and cities, visual navigation routes, waypoints as well as routes connecting the waypoints, ground based navigational aids, airports, obstructions, and airspace boundaries.

SUMMARY OF THE INVENTION

The present disclosure is directed to a Synthetic Vision System (SVS) view combined with information from navigation charts. A synthetic terrain representation is generated. Then a combination of the synthetic terrain representation and navigation chart information is generated. The combination of the synthetic terrain representation and the navigation chart information may be displayed.

If utilized in a vehicle, navigation chart information may be determined which is not relevant to a current planned course and excluded from the combination. Additionally, the combination may include an indicator indicating the intended path of the current planned course. The intended path of the current planned course may be indicated as a line (or other visual metaphor) drawn across the synthetic terrain representation illustrating the intended path.

The combination may be generated with a first level of detail of navigation chart information when further away or a second level of detail of navigation chart information when close. The second level of detail may be more detailed than the first level of detail. Thus, more detailed navigation chart information may be displayed as landmarks are approached.

The navigation chart information may contain information related to navigation aids (such as VHF Omni-directional Radio Range (VOR), a type of radio navigation). The combination may include at least one indicator representing one or more navigation aids based upon navigation chart information.

The combination may include text based navigation chart information. For example, the elevation of topographical features of the combination may be indicated by a textual representation of the elevation. As an additional example, features of an airport (including, but not limited to, name, altitude, runway length, communication frequencies, and the like) indicated in the combination may be described by textual representations of the features.

The present disclosure provides a SVS view combined with information from the navigation charts. An operator of a vehicle is not required to mentally combine the information from the SVS view with the navigation charts in order to operate a vehicle. This results in increased situational awareness and decreased complexity in the operation of the vehicle. In a typical SVS implementation, navigation chart information is either provided on a separate display or provided on a paper copy. The present disclosure combines SVS and navigation chart information into a single display which improves situational awareness while also reducing flight deck equipage requirements.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the disclosure, examples of which are illustrated in the accompanying drawings.

Figure 1:
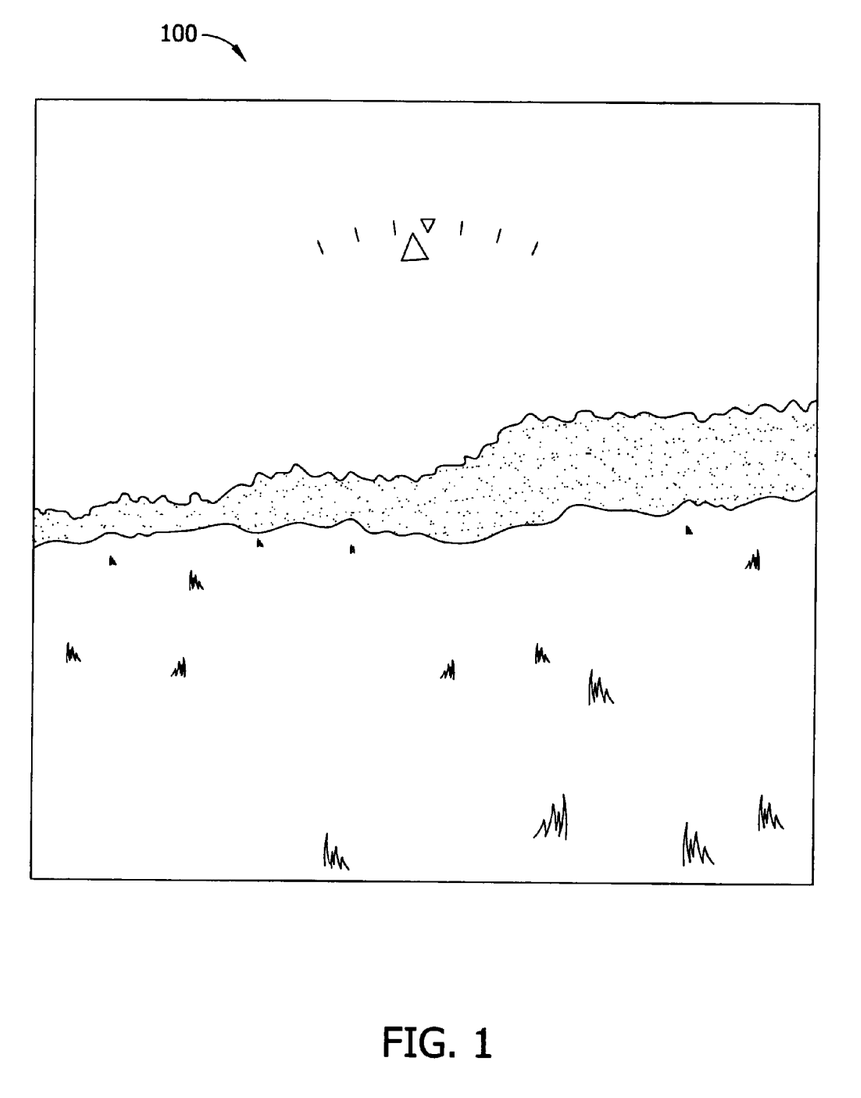
FIG. 1 is a diagram illustrating a Synthetic Vision System (SVS) view.
Figure 2:
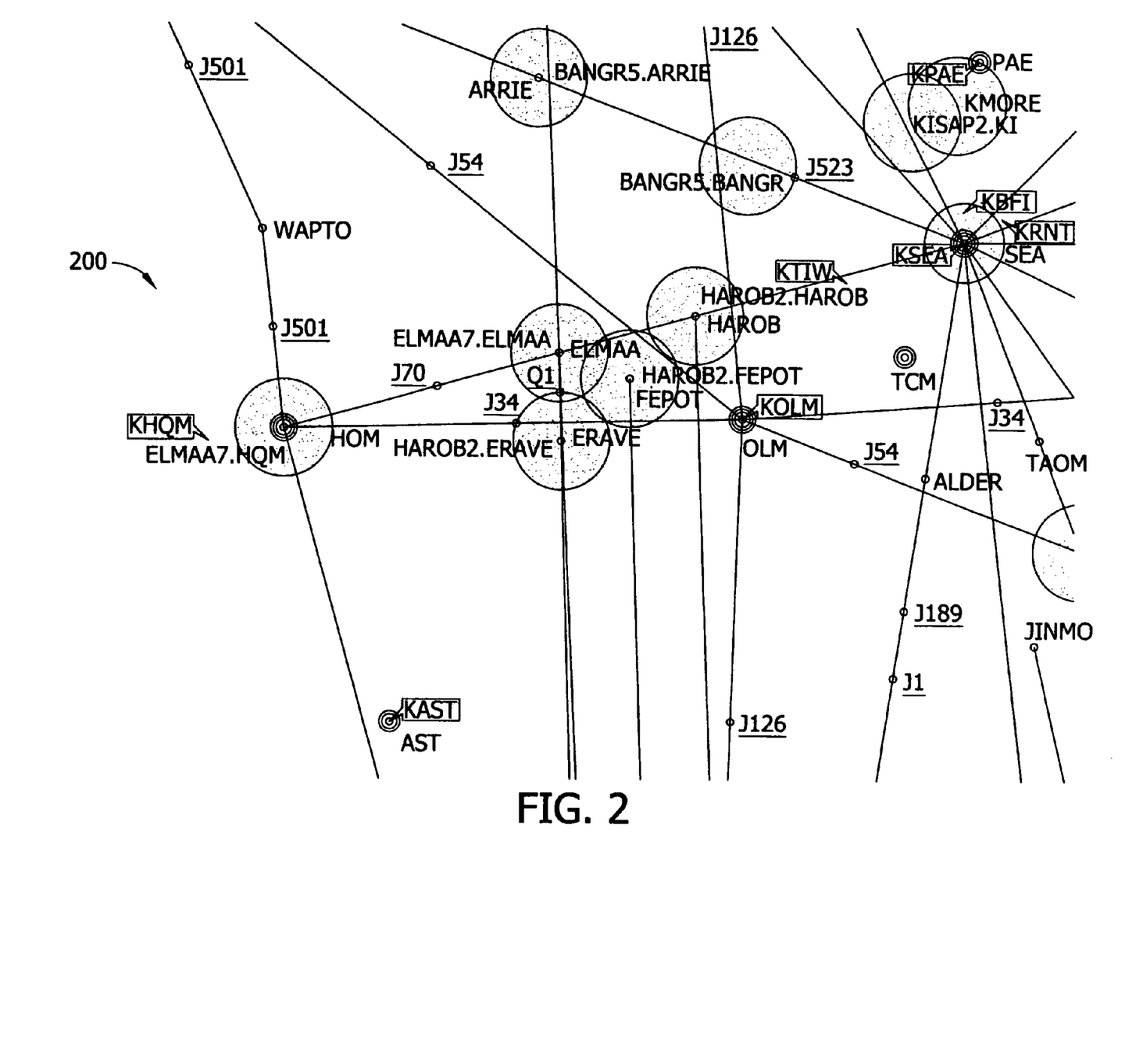
FIG. 2 is a diagram illustrating a navigation chart.

Referring generally to FIG. 1, a Synthetic Vision System (SVS) view 100 is illustrated. Referring generally to FIG. 2, a navigation chart 200 is illustrated.

The Synthetic Vision System (SVS) view 100 does not include information from the navigation charts 200. The navigation charts 200 are displayed separately from the SVS view 100. Thus, in order to operate the vehicle, the operator is required to mentally combine the information from the SVS view 100 with the navigation charts 200. The result is decreased situational awareness and increased complexity in the operation of the vehicle.

Figure 3:
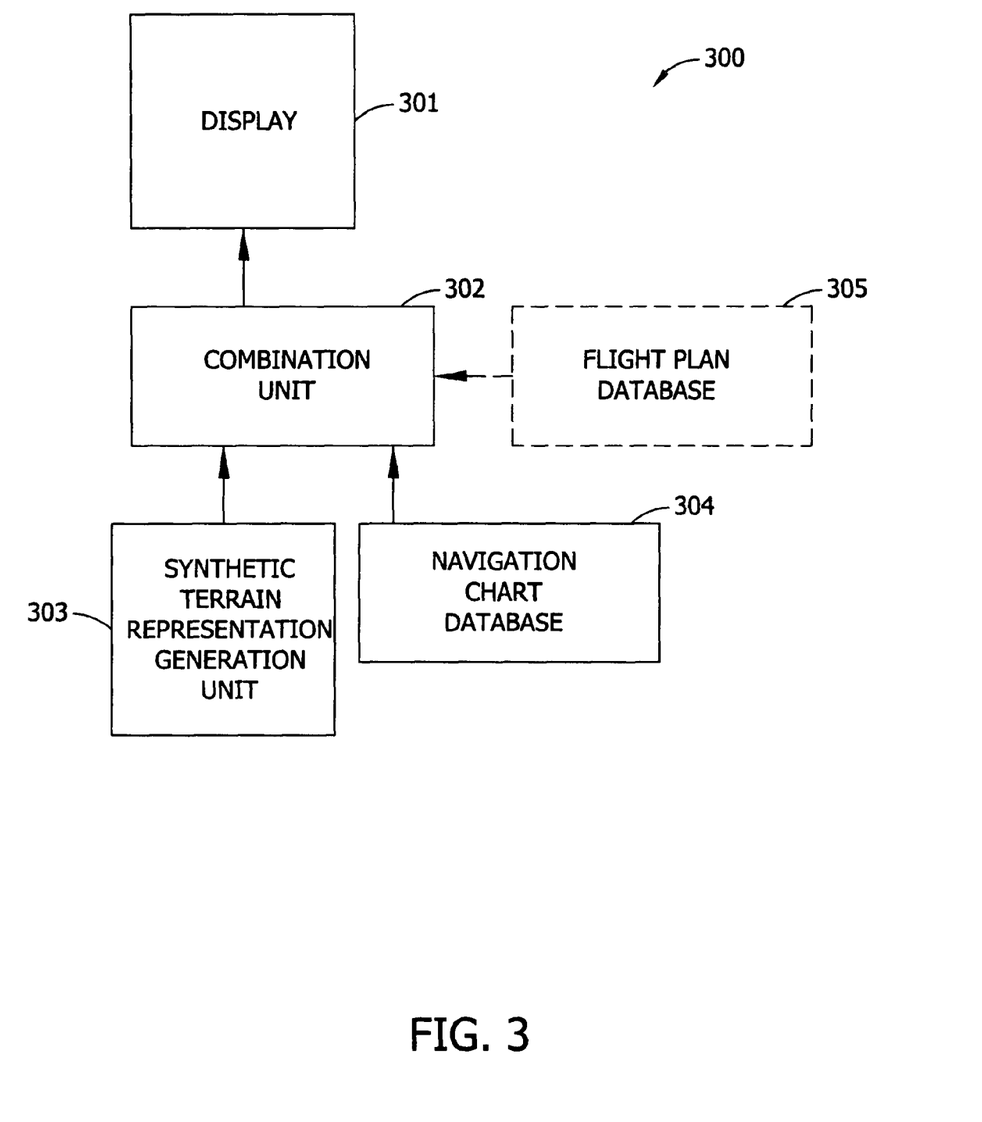
FIG. 3 is a block diagram illustrating a SVS display apparatus for displaying navigation chart information combined with a synthetic terrain representation, in accordance with an exemplary embodiment of the present disclosure.

Referring generally to FIG. 3; synthetic vision system (SVS) display apparatus 300 for displaying navigation chart information combined with a synthetic terrain representation, in accordance with an exemplary embodiment of the present disclosure, is illustrated. The apparatus 300 comprises a display 301, a combination unit 302 operatively coupled to the display 301, a synthetic terrain representation generation unit 303 operatively coupled to the combination unit 302, and a navigation chart database 304 operatively coupled to the combination unit 302. The synthetic vision system (SVS) display apparatus 300 may be utilizable in a vehicle including, but not limited to, an aircraft, a tank, an automobile, a boat, or a submarine.

The synthetic terrain representation generation unit 303 generates a synthetic terrain representation. The combination unit 302 generates a combination of the synthetic terrain representation with navigation chart information from the navigation chart database 304. The display 301 displays the combination generated by the combination unit 302.

If the synthetic vision system (SVS) display apparatus 300 in utilized in an aircraft, the synthetic vision system (SVS) display apparatus 300 may also comprise a flight plan database 305 which includes a current flight plan operatively coupled to the combination unit 302. The combination unit 302 may determine navigation chart information from the navigation chart database 304 which is not relevant to the current flight plan and exclude the irrelevant navigation chart information from the combination. Alternatively, if the synthetic vision system (SVS) display apparatus 300 in utilized in a vehicle other than an aircraft which utilizes a planned course (including, but not limited to a tank, an automobile, a boat, or a submarine), the plan database 305 may comprise any kind of course plan database which includes a current planned course.

The combination unit 302 may be operable to generate the combination with a first level of detail of navigation chart information from the navigation chart database 304 and a second level of detail of navigation chart information from the navigation chart database 304. The second level of detail may be more detailed than the first level of detail. The combination unit 302 may generate the combination with the second level of detail when close and the first level of detail when further away. Thus, more detailed navigation chart information is displayed as landmarks are approached.

If the synthetic vision system (SVS) display apparatus 300 in utilized in an aircraft and the synthetic vision system (SVS) display apparatus 300 includes a flight plan database 305, the combination may include an indicator indicating the intended path of the current flight plan. The intended path of the current flight plan may be indicated as a flight shadow (line drawn across the synthetic terrain representation illustrating the intended path). Note that although this example has been described in the context of an aircraft with a current flight plan, this example could be applied to other vehicles (including, but not limited to, a tank, an automobile, a boat, or a submarine) which utilize planned courses without departing from the scope of the present disclosure.

The navigation chart database 304 may include navigation chart information related to navigation aids (such as VHF Omni-directional Radio Range (VOR), a type of radio navigation). The combination generated by the combination unit 302 may include at least one indicator representing one or more navigation aids based upon navigation chart information.

The combination generated by the combination unit 302 may include text based on navigation chart information. For example, the elevation of topographical features of the combination may be indicated by a textual representation of the elevation. As an additional example, features of an airport (including, but not limited to, name, altitude, runway length, communication frequencies, and the like) indicated in the combination may be described by textual representations of the features.

Figure 6:
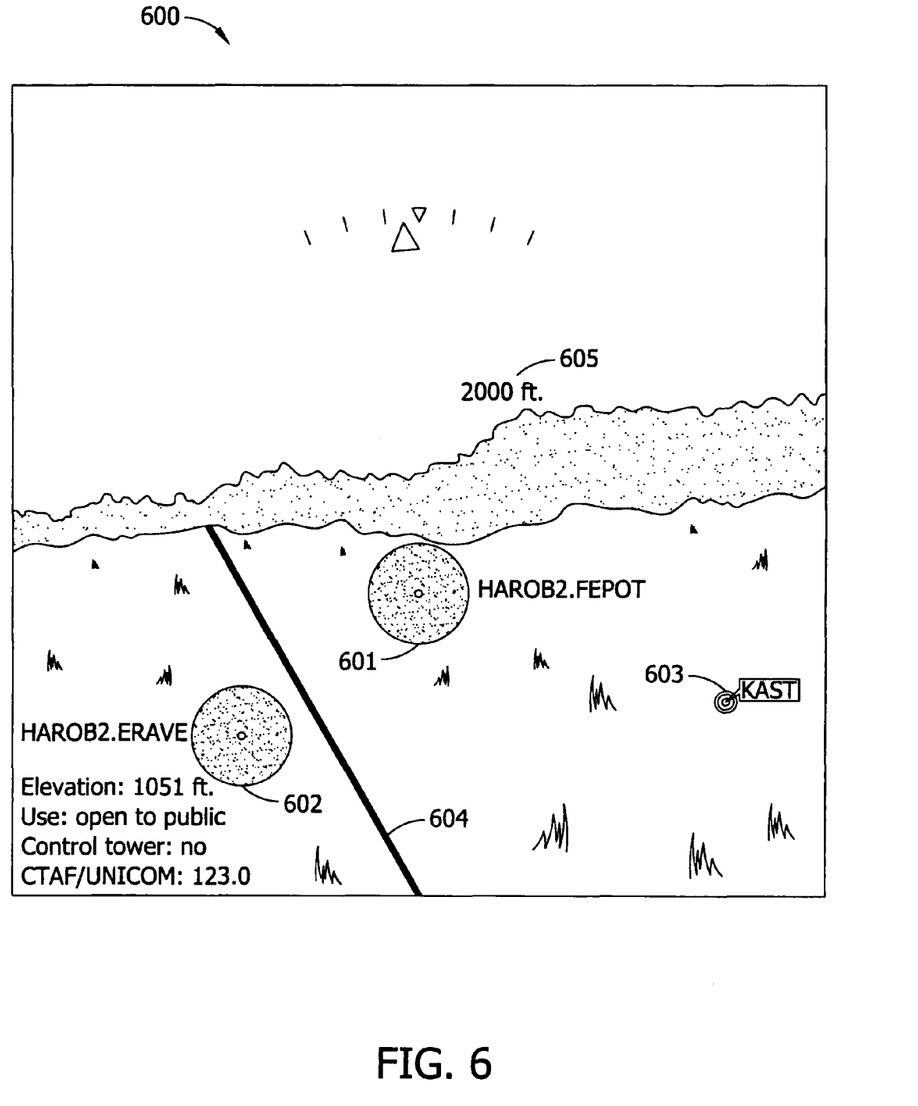
FIG. 6 is a diagram illustrating a Synthetic Vision System (SVS) view combined with navigation chart information.

Referring now to FIG. 6, a SVS view combined with navigation chart information 600, in accordance with an exemplary embodiment of the present invention, is illustrated. The SVS view 600 is shown combined with navigation chart information elements 601-605. The location and identifier of airports 601 and 602 are shown indicated on the SVS view 600. Airport 601 is further away and is shown with a first level of detail. Airport 602 is closer and is shown in a second, more detailed, level of detailed. As illustrated, additional information related to the utilization of airport 602 is presented as text on the SVS view 600. Indicator 603 indicates the location and identifier of a navigation aid. Indicator 604 indicates the intended path of the current flight plan. Text 605 illustrates text based navigation chart information relating to the elevation of topographical features of the terrain presented in SVS view 600. Although the present disclosure has been described in the context of the combination of the SVS view and navigation chart information illustrated in FIG. 6, a SVS view and navigation chart information may be combined in a different manner than that illustrated in FIG. 6 without departing from the scope of the present disclosure.

Figure 4:
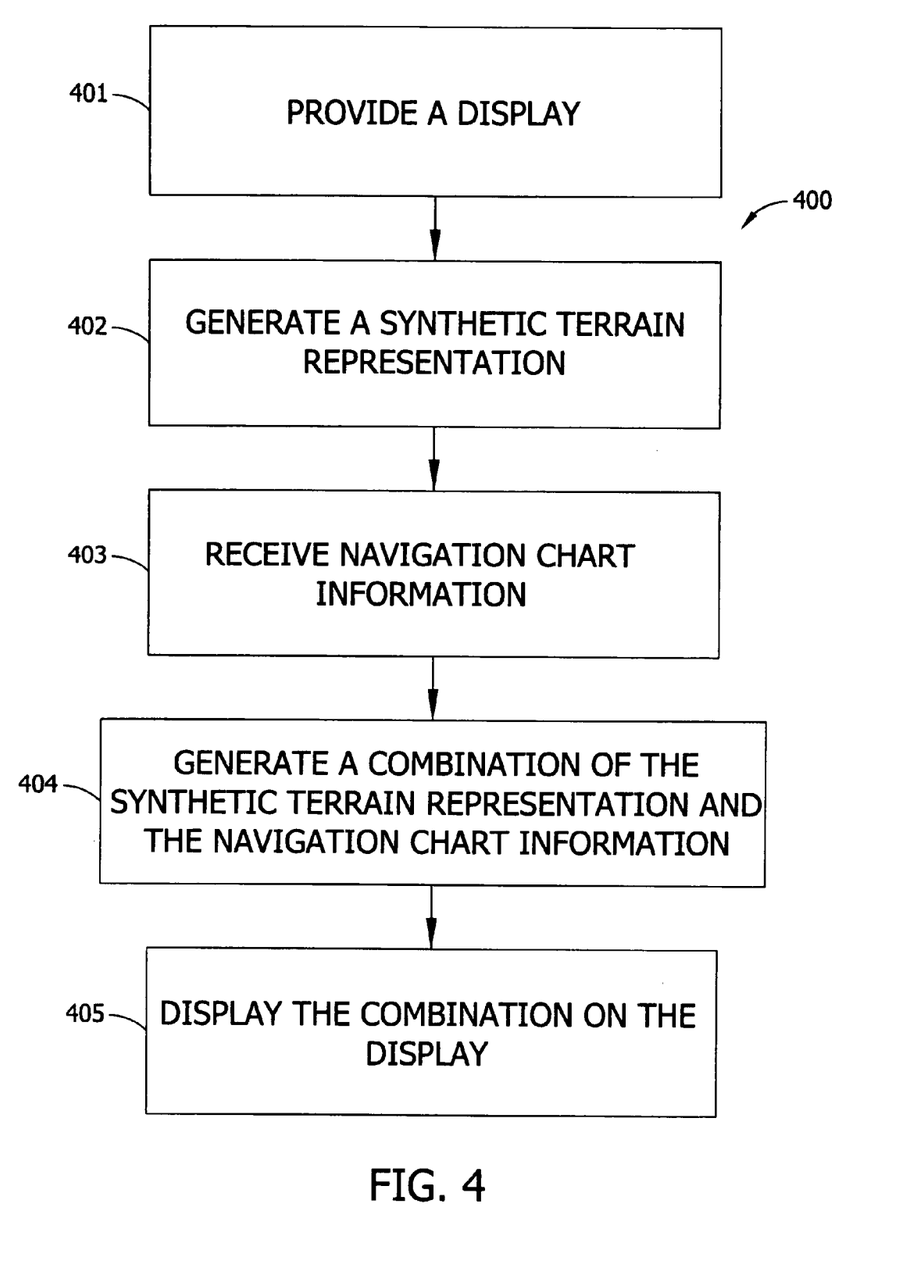
FIG. 4 is a flow chart illustrating a method of displaying navigation chart information combined with a synthetic terrain representation on an SVS display, in accordance with an exemplary embodiment of the present disclosure.

Referring now to FIG. 4; a method 400 of displaying navigation chart information combined with a synthetic terrain representation on an synthetic vision system (SVS) display, in accordance with an alternative embodiment of the present disclosure, is shown. In step 401, a display is provided. In step 402, a synthetic terrain representation is generated. In step 403, navigation chart information is received. In step 404, a combination of the synthetic terrain representation and the navigation chart information is generated. Step 404 may generate the combination with a first level of detail of navigation chart information or a second level of navigation chart information wherein the second level of detail is more detailed than the first level of detail. The second level of detail may be generated when closer and the first level of detail may be generated when further away. Step 404 may further comprise the steps of receiving a current course plan, determining navigation chart information which is irrelevant to the current course plan, and excluding the irrelevant information from the combination. Step 404 may further comprise the steps of receiving a current course plan and the combination may include an indicator which represents the intended path of the current course plan. The navigation chart information may include at least one navigation aid and the combination may include an indicator representing at least one navigation aid. The combination may include text based on navigation chart information. In step 405, the combination is displayed on the display.

Figure 5:
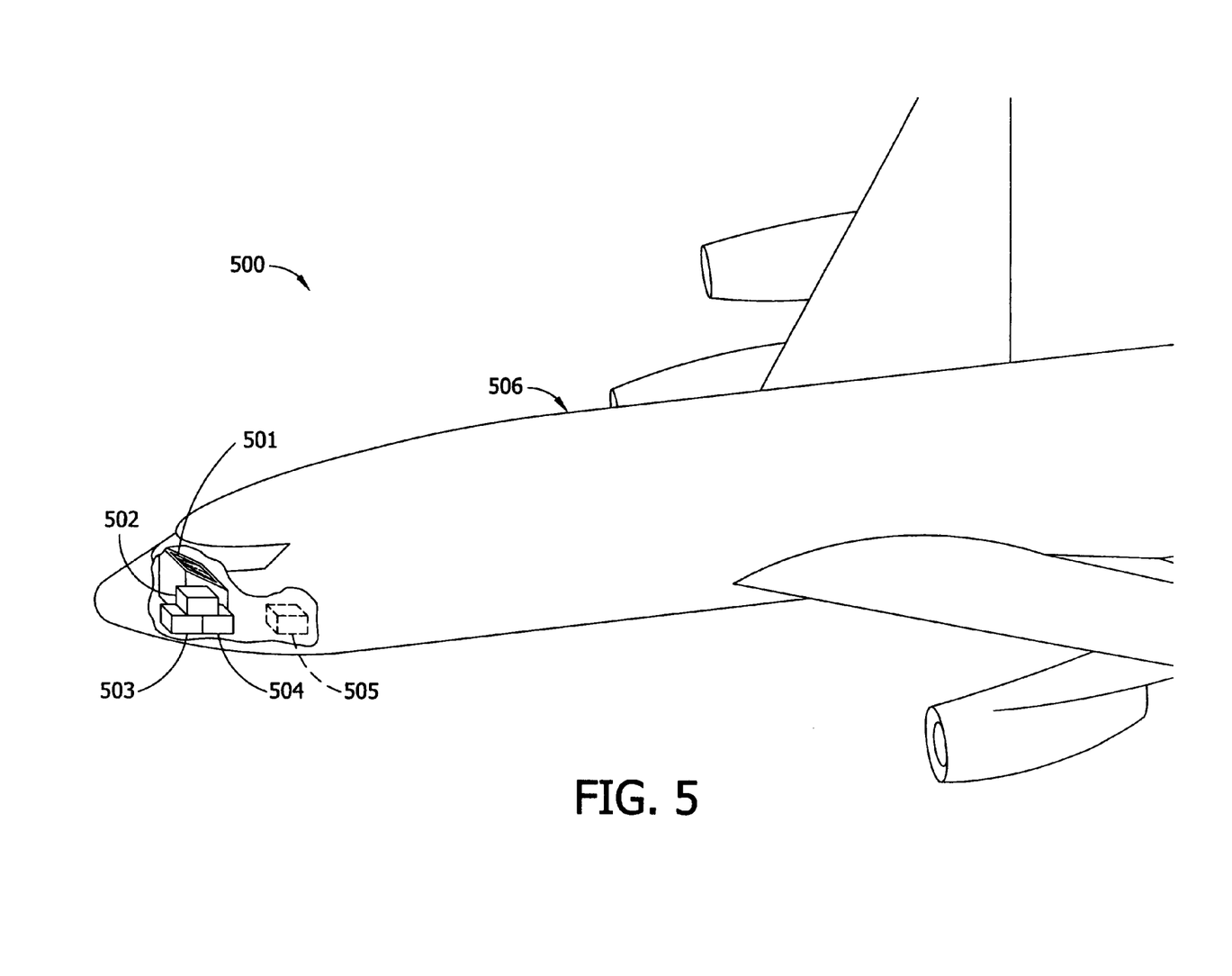
FIG. 5 is a diagram illustrating a system for displaying navigation chart information combined with a synthetic terrain representation on a SVS display for a vehicle, in accordance with an exemplary embodiment of the present disclosure.

Referring now to FIG. 5, a system 500 for system for displaying navigation chart information combined with a synthetic terrain representation on a SVS display for a vehicle, in accordance with an alternative embodiment of the present disclosure, is shown. The system 500 includes a vehicle 506, a display 501, a synthetic terrain representation generation component 503, a navigation chart database 504, and a combination component 502. The synthetic terrain representation generation component 503 generates a synthetic terrain representation. The combination component 502 generates a combination of the synthetic terrain representation and navigation chart information from the navigation chart database 504. The display 501 displays the combination.

The system 500 may also comprise a course plan database 505 which includes a current course plan. The combination component 502 may determine navigation chart information from the navigation chart database 504 which is not relevant to the current course plan and exclude the irrelevant navigation chart information from the combination. The combination component 502 may generate the combination including an indicator indicating the intended path of the current course plan. The intended path of the current course plan may be indicated as a line (or other visual metaphor) drawn across the synthetic terrain representation illustrating the intended path.

The combination component 502 may be operable to generate the combination with a first level of detail of navigation chart information from the navigation chart database 504 and a second level of detail of navigation chart information from the navigation chart database 504. The second level of detail may be more detailed than the first level of detail. The combination component 502 may generate the combination with the second level of detail when close to the vehicle 506 and the first level of detail when further away. Thus, more detailed navigation chart information is displayed as landmarks are approached. The navigation chart database 504 may include navigation chart information related to navigation aids (such as VHF Omni-directional Radio Range (VOR), a type of radio navigation). The combination generated by the combination component 502 may include at least one indicator representing one or more navigation aids based upon navigation chart information. The combination generated by the combination component 502 may include text based on navigation chart information. For example, the elevation of topographical features of the combination may be indicated by a textual representation of the elevation. As an additional example, features of an airport (including, but not limited to, name, altitude, runway length, communication frequencies, and the like) indicated in the combination may be described by textual representations of the features.

The present disclosure provides a SVS view combined with information from the navigation charts. An operator of a vehicle is not required to combine the information from the SVS view with the navigation charts in their head in order to operate a vehicle. This results in increased situational awareness and decreased complexity in the operation of the vehicle.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A synthetic vision system (SVS) display apparatus, comprising:
a display;
a combination unit, the combination unit being operatively coupled to the display;
a synthetic terrain representation generation unit, the synthetic terrain representation generation unit being operatively coupled to the combination unit, the synthetic terrain representation generation unit being configured for generating a synthetic terrain representation;
a navigation chart database, the navigation chart database being operatively coupled to the combination unit, the navigation chart database being configured for storing navigation chart information; and
a course plan database, the course plan database being operatively coupled to the combination unit, the course plan database being configured for storing a current course plan comprising an intended path;
wherein the combination unit is configured for: comparing the navigation chart information to the current course plan; based upon said comparison, determining that a first portion of the navigation chart information is relevant to the current course plan and determining that a second portion of the navigation chart information is irrelevant to the course plan; combining the first portion of the navigation chart information and the synthetic terrain representation to form a combination; excluding the second portion of the navigation chart information from the combination; and providing the combination to the display, the display being configured for displaying the combination.

2. The SVS display apparatus as claimed in claim 1, wherein the combination unit is configured to generate the combination with one selected from a first level of detail of navigation chart information and a second level of detail of navigation chart information.

3. The SVS display apparatus as claimed in claim 2, wherein the second level of detail is more detailed than the first level of detail and the combination unit generates the combination with the second level of detail when closer and with the first level of detail when further away.

4. The SVS display apparatus as claimed in claim 1, wherein the combination includes an indicator based on navigation chart information which represents an intended path of the current course plan.

5. The SVS display apparatus as claimed in claim 1, wherein the combination includes at least one indicator based on navigation chart information which represents at least one navigation aid.

6. The SVS display apparatus as claimed in claim 1, wherein the combination includes text based on navigation chart information.

7. A system comprising:
   a vehicle;
   a display;
   a combination component, the combination component being operatively coupled to the display;
   a synthetic terrain representation generation component, the synthetic terrain representation generation component being operatively coupled to the combination component, the synthetic terrain representation generation component being configured for generating a synthetic terrain representation;
   a navigation chart database, the navigation chart database being operatively coupled to the combination component, the navigation chart database being configured for storing navigation chart information; and
   a course plan database, the course plan database being operatively coupled to the combination component, the course plan database being configured for storing a current course plan comprising an intended path;
   wherein the combination component is configured for: comparing the navigation chart information to the current course plan; based upon said comparison, determining that a first portion of the navigation chart information is relevant to the current course plan and determining that a second portion of the navigation chart information is irrelevant to the course plan; combining the first portion of the navigation chart information and the synthetic terrain representation to form a combination; excluding the second portion of the navigation chart information from the combination; and providing the combination to the display, the display being configured for displaying the combination.

8. The system of claim 7, wherein the combination component is configured to generate the combination with one selected from a first level of detail of navigation chart information and a second level of detail of navigation chart information.

9. The system of claim 8, wherein the second level of detail is more detailed than the first level of detail and the combination component generates the combination with the second level of detail when closer and with the first level of detail when further away.

10. The system of claim 7, wherein the combination includes an indicator based on navigation chart information which represents an intended path of the current course plan.

11. The system of claim 7, wherein the combination includes at least one indicator based on navigation chart information which represents at least one navigation aid.

12. The system of claimed in claim 7, wherein the combination includes text based on navigation chart information.

* * * * *